US011594047B2

(12) United States Patent
Kiyokawa et al.

(10) Patent No.: US 11,594,047 B2
(45) Date of Patent: Feb. 28, 2023

(54) ARTICLE DISTINGUISHING SYSTEM

(71) Applicant: Daifuku Co., Ltd., Osaka (JP)

(72) Inventors: Wataru Kiyokawa, Tokyo (JP); Keigo Takahashi, Tokyo (JP); Atsushi Minoo, Tokyo (JP); Kazutoshi Ito, Tokyo (JP)

(73) Assignee: Daifuku Co., Ltd., Osaka (JP)

( * ) Notice: Subject to any disclaimer, the term of this patent is extended or adjusted under 35 U.S.C. 154(b) by 128 days.

(21) Appl. No.: 17/173,538

(22) Filed: Feb. 11, 2021

(65) Prior Publication Data
US 2021/0248352 A1 Aug. 12, 2021

(30) Foreign Application Priority Data
Feb. 12, 2020 (JP) .............................. JP2020-021778

(51) Int. Cl.
*G06V 20/00* (2022.01)
*G06V 20/64* (2022.01)
*G06K 9/62* (2022.01)
*G06V 10/22* (2022.01)
*G06V 20/13* (2022.01)

(52) U.S. Cl.
CPC ........... *G06V 20/64* (2022.01); *G06K 9/6256* (2013.01); *G06V 10/22* (2022.01); *G06V 20/13* (2022.01)

(58) Field of Classification Search
CPC ........ G06V 20/64; G06V 10/22; G06V 20/13; G06V 2201/06; G06V 20/52; G06V 20/20; G06K 9/6256
USPC ........................................................ 382/103
See application file for complete search history.

(56) References Cited

U.S. PATENT DOCUMENTS

| 2015/0193758 | A1 | 7/2015 | Nimiya |
| 2019/0193947 | A1* | 6/2019 | Koga ..................... B65G 47/00 |
| 2019/0236531 | A1* | 8/2019 | Adato ................ G06Q 10/0633 |
| 2021/0253375 | A1 | 8/2021 | Gondoh et al. |

FOREIGN PATENT DOCUMENTS

| JP | 201543175 | A | | 3/2015 |
| JP | 2015042586 | A | * | 3/2015 |
| JP | 2018028461 | A | * | 2/2018 |
| WO | 2019140091 | A1 | | 7/2019 |
| WO | 2019208292 | A1 | | 10/2019 |

* cited by examiner

*Primary Examiner* — Neil R McLean
(74) *Attorney, Agent, or Firm* — The Webb Law Firm

(57) ABSTRACT

An article distinguishing system includes: an identification information acquisition unit, an image capture unit that captures an image of an exterior of a target article, a determination unit that derives a degree of matching between the captured image of the target article and exterior image data stored in a storage unit, and determines whether or not the current state is a normal state in which exterior image data for which the degree of matching is a determination threshold value or more is present, and a learning processing unit that executes learning processing if it has been determined by the determination unit that the current state is not the normal state. The learning processing is processing for storing the data of the captured image as new exterior image data in the storage unit in association with the identification information acquired by the identification information acquisition unit.

8 Claims, 3 Drawing Sheets

ARTICLE DISTINGUISHING SYSTEM

CROSS-REFERENCE TO RELATED APPLICATION

This application claims priority to Japanese Patent Application No. 2020-021778 filed Feb. 12, 2020, the disclosure of which is hereby incorporated by reference in its entirety.

BACKGROUND OF THE INVENTION

1. Field of the Invention

The present invention relates to an article distinguishing system using exterior image data of articles.

2. Description of the Related Art

An example of the above-described article distinguishing system is disclosed in JP 2015-43175A. Hereinafter, the reference signs shown in parentheses in the description of the related art are those of JP 2015-43175A. In JP 2015-43175A, the article distinguishing system is applied to an article recognition apparatus (3) for recognizing a position of an article (50) to be retrieved in a situation in which an article (50) is to be retrieved from a container (51). The article recognition apparatus (3) recognizes the position of the article (50) using a template image including a pattern on the outer surface of the article (50). Specifically, the article recognition apparatus (3) recognizes the position of the article (50) by detecting, as an article presence region (M), a region which is included in a captured image of the container (51) containing the article (50) and in which a degree of matching with the template image is a predetermined threshold value or more. In this manner, JP 2015-43175A discloses an article distinguishing system using a template image serving as exterior image data.

SUMMARY OF THE INVENTION

Incidentally, the exterior design of an article such as a pattern on an outer surface is changed even for articles of the same type in some cases. For example, if the articles are containers for containing products (e.g., cardboard boxes for containing food products), even if the containers are of the same type (specifically, containers in which products of the same type are contained), the design on the outer surfaces of the containers (package design) may be changed according to the season or due to sales promotion activities such as a sale. In order to perform suitable distinguishing in an article distinguishing system, if the exterior design of the article has been changed, exterior image data corresponding to the changed exterior design is needed. In view of this, although it is conceivable that the exterior image data is newly generated and registered each time the exterior design of the article is changed, in such a case, there is a risk of incurring an increase in labor performed by the operator operating the article distinguishing system, a decrease in the processing speed of the apparatus to which the article distinguishing system is applied (the article recognition apparatus in Patent Document 1), and the like due to the frequency of generation and registration of exterior image data increasing.

In view of this, realization of an article distinguishing system that can suppress the frequency of generation and registration of exterior image data to a low level is desired.

An article distinguishing system according to the present disclosure includes: a storage unit configured to store exterior image data, which is data of an exterior image of an article, in association with identification information of the article; an identification information acquisition unit configured to acquire identification information of a target article, which is an article to be subjected to distinguishing; an image capture unit configured to capture an image of an exterior of the target article; a determination unit configured to derive a degree of matching between a captured image of the target article captured by the image capture unit and the exterior image data stored in the storage unit in association with the identification information acquired by the identification information acquisition unit, and determine whether or not the current state is a normal state in which the exterior image data for which the degree of matching is a determination threshold value or more is present; and a learning processing unit configured to execute learning processing if it has been determined by the determination unit that the current state is not the normal state. The learning processing is processing for storing data of the captured image as new said exterior image data in the storage unit in association with the identification information acquired by the identification information acquisition unit, and the storage unit stores a specified number, which is two or more, of pieces of the exterior image data in association with one piece of identification information in sequence starting from the exterior image data that was stored in the storage unit most recently.

According to the present configuration, if it is determined by the determination unit that the current state is not the normal state, that is, if exterior image data for which the degree of matching with a captured image of a target article is a determination threshold value or more is not present in the storage unit, the captured image of the target article can be stored in the storage unit as new exterior image data in association with the identification information of the target article through learning processing. Accordingly, if the exterior design of the target article has been changed, exterior image data corresponding to the changed exterior design can be generated and registered. This makes it possible to reduce labor performed by an operator compared to a case in which an operator manually performs a task of generating and registering exterior image data corresponding to a changed exterior design.

Incidentally, the exterior design of a target article is periodically changed between multiple exterior designs in some cases, and is returned to the original design after being temporarily changed in some cases. For example, if the target article is a container for containing a product, the exterior design of the target article is changed periodically between multiple exterior designs according to the season, or is returned to the original design after being temporarily changed due to a sales promotion activity such as a sale. In these cases, the changed exterior design of the target article is the same as the exterior design of the target article before the change or prior thereto. With a focus on this point, in the present configuration, a specified number of pieces of exterior image data are stored in the storage unit in association with one piece of identification information in sequence starting from the exterior image data that was stored in the storage unit most recently. This makes it possible for exterior image data corresponding to a changed exterior design to be present in the storage unit if the exterior design of the target article is changed periodically between multiple exterior designs or is returned to its original design after being changed temporarily. If exterior image data corresponding to the changed exterior design is present in the storage unit, there is no need to generate and register exterior image data corresponding to the changed exterior design, and therefore the frequency of generating and registering exterior image data can be accordingly suppressed to a low level.

Note that in the present configuration, although the exterior image data stored in the storage unit prior to the above-described specified number of pieces of exterior image data is deleted from the storage unit, even if the changed exterior design of the target article is the same as a prior exterior design of the target article, it is often the case that the prior exterior design was used relatively recently. For this reason, according to the present configuration, by limiting the number of pieces of exterior image data stored in association with one piece of identification information to a specified number or less, it is possible to leave exterior image data corresponding to an exterior design that is highly likely to be used again in the storage unit while achieving a reduction of the storage capacity needed for the storage unit.

Further features and advantages of the article distinguishing system will become evident from the following embodiments, which will be described with reference to the drawings.

DETAILED DESCRIPTION OF PREFERRED EMBODIMENTS

Embodiments of the article distinguishing system will be described with reference to the drawings.

Figure 1:
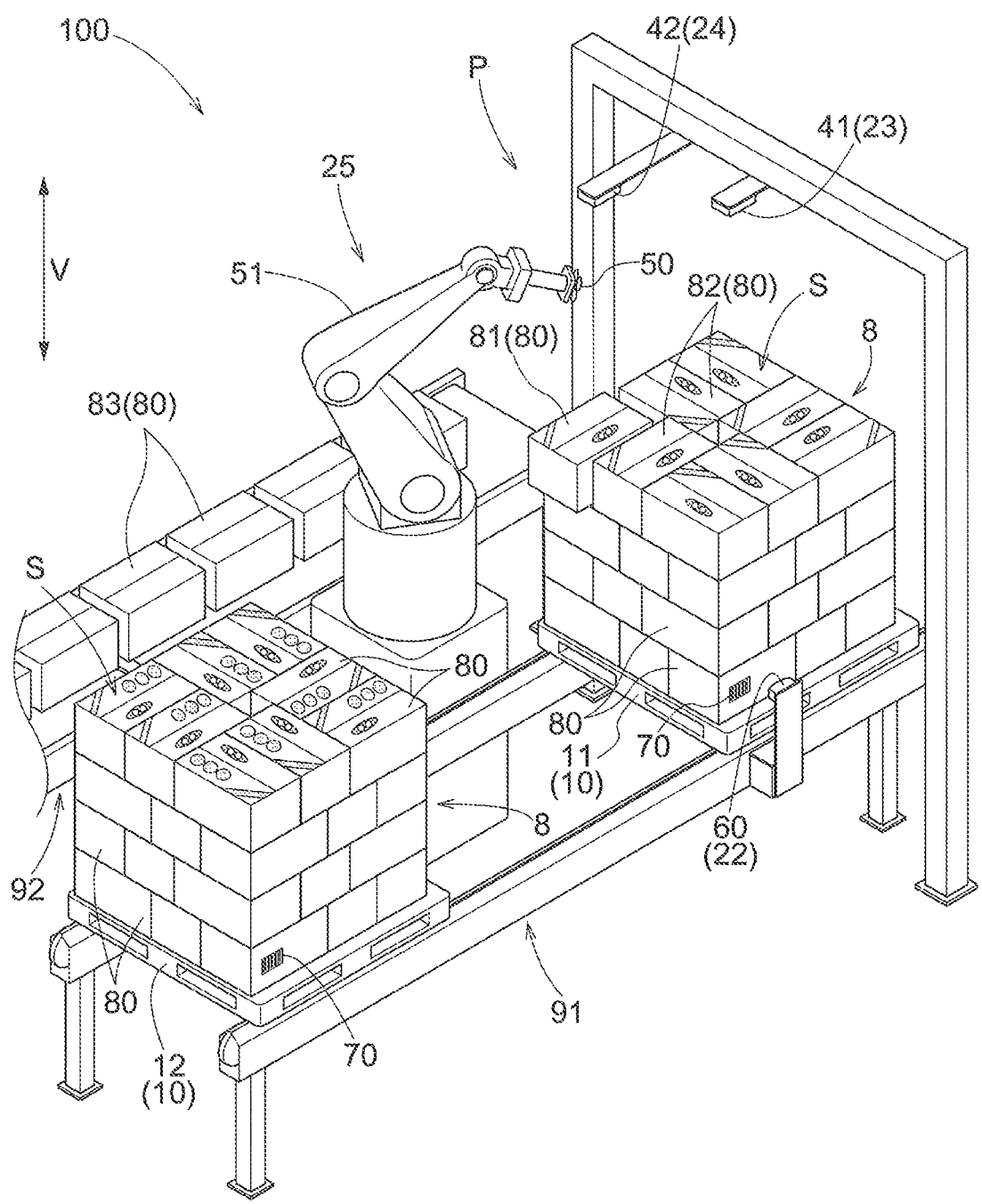
FIG. 1 is a perspective view showing a portion of a distribution facility in which an article distinguishing system is applied.

An article distinguishing system 1 is a system that performs distinguishing using exterior image data, which is data of an exterior image of an article 80, on a target article 81, which is an article 80 to be subjected to distinguishing. In the present embodiment, the article distinguishing system 1 is applied to a distribution facility 100 illustrated in FIG. 1. FIG. 1 shows only the vicinity of a retrieval location P in the distribution facility 100. A first conveying apparatus 91 and a second conveying apparatus 92 are provided at the retrieval location P. The first conveying apparatus 91 conveys a support body 10 such as a pallet to the retrieval location P. An article group 8, which is a group of multiple articles 80, has been placed on the support body 10. At the retrieval location P, retrieval processing for sequentially selecting the target article 81 from the article group 8 placed on the support body 10 and retrieving the selected target article 81 from the support body 10 is executed. The second conveying apparatus 92 conveys the target article 81 (processed article 83) retrieved from the support body 10 from the retrieval location P.

The article 80 has an exterior (exterior design) corresponding to the type of the article 80. In general, mutually different types of articles 80 have mutually different exteriors. A mark (character, graphic, photograph, drawing, symbol, combination thereof, etc.) provided through printing, pasting, or the like on the outer surface of the article 80, a pattern on the outer surface of the article 80, a color of the outer surface of the article 80, and a shape (e.g., the outer edge shape of the outer surface) of the article 80 can be given as examples of elements constituting the exterior of the article 80. Note that the exterior design of the article 80 is changed even for articles 80 of the same type in some cases. In the example shown in FIG. 1, the article 80 placed on the support body 10 (first support body 11) conveyed to the retrieval location P is an article 80 that is of the same type as the article 80 placed on the support body 10 (second support body 12) that is to be conveyed to the retrieval location P next, but the exterior of its upper surface S is different. Note that in FIG. 1, the mark, pattern, or the like provided on the upper surface S is omitted on the processed article 83.

The articles 80 of the same type have the same outer shape and the same dimension. One or both of the outer shape and the dimension are the same between the multiple articles 80 of mutually different shapes in some cases as well. As shown in FIG. 1, in the present embodiment, the outer shape of the article 80 is formed into a cuboid shape (includes a cube shape). Also, the article 80 is arranged in an orientation in which one outer surface faces upward, or in other words, in an orientation in which one of three sides extending from one vertex of the cuboid forming the outer shape of the article 80 extends along a vertical direction V. That is, the article 80 has six outer surfaces including an upper surface S (top surface).

In the present embodiment, the article 80 is a container for containing cargo (a product, etc.). For this reason, the type of the article 80 is determined according to the type of the cargo contained in the article 80. That is, two articles 80 that contain cargo of the same type are treated as articles 80 of the same type. On the other hand, even if two articles 80 containing cargo of mutually different types are containers of the same type, the two articles 80 are treated as articles 80 of different types. One article 80 contains one piece of cargo, or multiple pieces of cargo of the same type. The article 80 is, for example, a cardboard box, a container, or the like.

The support body 10 supports the article group 8 from below. As shown in FIG. 1, in the present embodiment, multiple articles 80 are arranged side by side in two horizontal directions that are orthogonal to each other on one support body 10. The two horizontal directions that are orthogonal to each other are two directions that are orthogonal to each other in a horizontal plane that is orthogonal to a vertical direction V. Also, in the present embodiment, multiple articles 80 are stacked (or in other words, are arranged overlapping in the vertical direction V) on one support body 10. In the present embodiment, the multiple articles 80 of the same type are placed on one support body 10. That is, the article group 8 placed on the support body 10 is a group of multiple articles 80 of the same type. In the example shown in FIG. 1, the multiple articles 80 arranged in mutually different orientations are included in the article group 8 placed on one support body 10. That is, the orientations of the articles 80 constituting the article group 8 placed on the one support body 10 are not the same.

Figure 2:
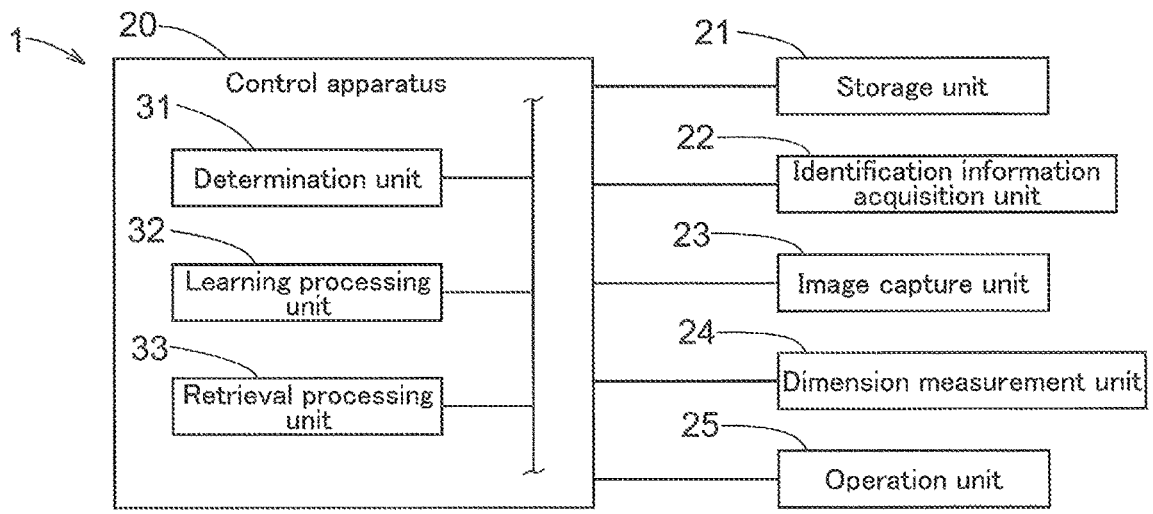
FIG. 2 is a block diagram showing a schematic configuration of an article distinguishing system.

As shown in FIG. 2, the article distinguishing system 1 includes a storage unit 21, an identification information acquisition unit 22, an image capture unit 23, a determination unit 31, and a learning processing unit 32. In the present embodiment, the article distinguishing system 1 further includes a dimension measurement unit 24, an operation unit 25, and a retrieval processing unit 33. In the present embodiment, the article distinguishing system 1 includes a control apparatus 20, and the control apparatus 20 includes multiple functional units, including a determination unit 31, a learning processing unit 32, and a retrieval processing unit 33. Note that the article distinguishing system 1 can also have a configuration in which at least one of the dimension measurement unit 24, the operation unit 25, and the retrieval processing unit 33 is not included. The technical features of the article distinguishing system 1 disclosed in the present specification can be applied also to the article distinguishing method of the article distinguishing system 1, and the article distinguishing method of the article distinguishing system 1 is also disclosed in the present specification. The article distinguishing method includes a step of the storage unit 21 storing later-described exterior image data, a step of the identification information acquisition unit 22 acquiring the identification information of the target article 81, a step of the image capture unit 23 capturing an image of the exterior of the target article 81, a step of the determining unit 31 determining whether or not the current state is a later-described normal state, and a step of the learning processing unit 32 executing later-described learning processing. In the present embodiment, the article distinguishing method further includes a step of the dimension measuring unit 24 measuring a dimension of the target article 81, a step of the storage unit 21 storing later-described dimension data, a step of the operation unit 25 moving the target article 81, and a step of the retrieval processing unit 33 retrieving the target article 81 from the support body 10. Steps (e.g., the steps performed by the storage unit 21) not performed by the control apparatus 20 (specifically, the functional units included in the control apparatus 20) among these steps are performed by the unit that performs the step under control by the control apparatus 20.

The control apparatus 20 is configured to be able to read and write data in the storage unit 21. Also, the control apparatus 20 is configured to be able to acquire identification information of the target article 81 acquired by the identification information acquisition unit 22, the captured image of the target article 81 captured by the image capture unit 23, and the dimension of the target article 81 measured by the dimension measurement unit 24. Also, the control apparatus 20 is configured to be able to control the operation of the operation unit 25. In this manner, the control apparatus 20 is connected by wire or wirelessly so as to be able to communicate to the storage unit 21, the identification information acquisition unit 22, the image capture unit 23, the dimension measurement unit 24, and the operation unit 25. The operations of the first conveying apparatus 91 and the second conveying apparatus 92 are controlled by the control apparatus 20, or are controlled by another control apparatus that can communicate with the control apparatus 20. The control apparatus 20 includes a computation processing apparatus such as a CPU (Central Processing Unit) and includes a peripheral circuit such as a memory, and the functions of the control apparatus 20 are realized through cooperation between these pieces of hardware and a program executed on hardware such as a computation processing apparatus.

The multiple functional units included in the control apparatus 20 are configured to be able to perform reception and transmission of information with each other. Note that the multiple functional units included in the control apparatus 20 are divided at least logically, and do not necessarily need to be divided physically. Also, the multiple functional units included in the control apparatus 20 do not need to be realized by hardware used in common, and may also be realized divided into multiple pieces of hardware that can communicate with each other. That is, the control apparatus 20 may also be constituted using not only one piece of hardware, but multiple pieces of hardware that can communicate with each other.

The storage unit 21 stores the exterior image data, which is data on the exterior image of the article 80, in association with the identification information of the article 80. Here, the identification information is information (i.e., type information) for identifying the type of the article 80. The exterior image data includes, for example, information on a mark provided on the outer surface of the article 80, information on a pattern on the outer surface of the article 80, information on the color of the outer surface of the article 80, information on the shape (e.g., the outer edge shape of the outer surface) of the article 80, or the like. In the present embodiment, the exterior image data is image data of the upper surface S of the article 80. For this reason, the exterior image data includes, for example, information on a mark provided on the upper surface S of the article 80, information on a pattern on the upper surface S of the article 80, information on a color of the upper surface S of the article 80, information on a shape of the upper surface S (e.g., the outer edge shape of the upper surface S) of the article 80, or the like.

The storage unit 21 stores a specified number, which is two or more, of pieces of exterior image data in association with one piece of identification information in sequence starting from the exterior image data that was stored in the storage unit 21 most recently. That is, the exterior image data stored prior to the specified number of pieces of exterior image data is deleted from the storage unit 21. For this reason, the number of pieces of exterior image data stored in association with one piece of identifying information is limited to the specified number or less. The specified number is, for example, 5. Note that regarding identification information for which the number of pieces of exterior image data generated previously is less than the specified number, the exterior image data that is less than the specified number is stored in the storage unit 21 in association with the identification information.

The exterior image data is collected in advance and stored in the storage unit 21 or is generated through later-described learning processing and stored in the storage unit 21. Collection of the exterior image data is performed on the article 80 (i.e., the article 80 that may be the target article 81) that may be the subject of the distinguishing performed by the article distinguishing system 1. For example, the article 80 placed on the support body 10 that is to be conveyed to the retrieval location P may be the target article 81. If feature amount extraction processing is performed on a captured image of the target article 81 in later-described matching degree derivation processing, the exterior image data for which the same feature amount extraction processing has been performed may be stored in the storage unit 21.

In the present embodiment, the storage unit 21 further stores the dimension data, which is data on the dimension of the article 80, in association with the identification information of the article 80. The dimension data of the article 80 that may be the target article 81 is collected and stored in the storage unit 21 in advance. In the present embodiment, the dimension data is data on a three-dimensional dimension of the article 80. As described above, in the present embodiment, the outer shape of the article 80 is formed into a cuboid shape, and information on the dimension of each of the three sides extending from one vertex of the cuboid forming the outer shape of the article 80 is included in the dimension data.

The storage unit 21 includes, for example, a storage medium that can store, read, and write information, such as a flash memory or a hard disk, as the hardware configuration. Although FIG. 2 illustrates a case in which the storage unit 21 is constituted by an apparatus separate from the control apparatus 20, the storage unit 21 may also be constituted using a storage apparatus included in the control apparatus 20. The storage unit 21 may also be provided in a server or a cloud server that can communicate with the control apparatus 20.

The identification information acquisition unit 22 acquires identification information of the target article 81. Note that "acquiring identification information of the target article 81" is a concept that includes both acquiring the identification information of an article 80 that has already been selected as the target article 81, and acquiring the identification information of an article 20 that is to be selected as the target article 81. As shown in FIG. 1, the identification information acquisition unit 22 includes a reading apparatus 60 that reads the identification information of the target article 81. The identification information acquisition unit 22 acquires the identification information of the target article 81 read by the reading apparatus 60. The identification information acquired by the identification information acquisition unit 22 (in other words, the identification information read by the reading apparatus 60) is held in an identification information holding unit 70. The identification information holding unit 70 holds the identification information of the article 80 in a state of being readable from an external apparatus. The reading apparatus 60 is configured to be able to read the identification information held by the identification information holding unit 70. For example, if the identification information holding unit 70 expresses the identification information as a barcode, the reading apparatus 60 is a barcode reader that reads barcodes. The identification information holding unit 70 may also be a two-dimensional code such as a QR code (registered trademark) or a mark such as a character or symbol, instead of a one-dimensional code such as a barcode. Also, the identification information holding unit 70 may also be an IC tag or the like in which the identification information is stored and according to which the identification information can be read through wireless communication. Note that the installation mode of the reading apparatus 60 shown in FIG. 1 is an example, and the installation mode of the reading apparatus 60 (installation position, number, etc.) can be modified as appropriate.

The identification information holding unit 70 is provided for each article 80 or for each article group 8. If the identification information holding unit 70 is provided for each article 80, the identification information holding unit 70 is provided through printing, pasting, or the like on the outer surface of each article 80, for example. Also, if the identification information holding unit 70 is provided for each article group 8, the identification information holding unit 70 is provided through pasting or the like on the outer surface of one article 80 included in the article group 8 or is provided through pasting or the like on the outer surface of the support body 10 supporting the article group 8, for example. For example, if the identification information holding unit 70 is an arrival label, the identification information holding unit 70 is provided on the target object (article 80, support body 10, etc.) through pasting or the like.

As described above, in the present embodiment, the article group 8 placed on the support body 10 is a group of multiple articles 80 of the same type. In this manner, if the article group 8 placed on the support body 10 is a group of multiple articles 80 of the same type, the identification information holding unit 70 can be provided for each article group 8. Note that even if the article group 8 placed on the support body 10 is a group of multiple articles 80 of the same type, the identification information holding unit 70 may also be provided for each article 80. In this case, by reading the identification information from the identification information holding unit 70 provided on one article 80 included in the article group 8, it is possible to acquire the identification information of all of the articles 80 constituting the article group 8.

Note that if the identification information of the article 80 has been stored in the storage unit 21 in association with the identification information of the support body 10 supporting the article 80, the identification information holding unit 70 can also be configured to hold the identification information of the support body 10. In this case, the reading apparatus 60 reads the identification information of the support body 10 from the identification information holding unit 70 provided on the support body 10 and the identification information acquisition unit 22 acquires the identification information of the article 80 associated with the identification information of the support body 10 by referencing the storage unit 21.

The image capture unit 23 captures an image of the exterior of the target article 81. As shown in FIG. 1, the image capture unit 23 captures an image of the exterior of the target article 81 using a first camera 41. In the present embodiment, the image capture unit 23 captures an image of the upper surface S of the target article 81. For this reason, the first camera 41 is arranged above the target article 81 in the vertical direction V. For example, a color camera that captures color images can be used as the first camera 41. Note that the installation mode of the first camera 41 shown in FIG. 1 is an example, and the installation mode (installation position, number, etc.) of the first camera 41 can be modified as appropriate.

The dimension measurement unit 24 measures the dimension of the target article 81. Note that "measuring the dimension of the target article 81" is a concept that includes both measuring the dimension of an article 80 that has already been selected as the target article 81 and measuring the dimension of an article 80 that is to be selected as the target article 81. As shown in FIG. 1, in the present embodiment, the dimension measurement unit 24 measures the dimension of the target article 81 using a second camera 42 that is arranged above the target article 81 in the vertical direction V. In the present embodiment, the dimension measurement unit 24 measures a three-dimensional dimension of the target article 81. That is, the dimension measurement unit 24 measures a dimension in a plan view (view in a direction along the vertical direction V) of the target article 81 and the height (dimension in the vertical direction V) of the target article 81. Here, a TOF (Time of Flight) camera (i.e., a distance image sensor of a TOF scheme) is used as a second camera 42. The dimension measurement unit 24 measures the dimension of the target article 81 based on the distance image (image including distance information) obtained through image capture of the target article 81 performed by the second camera 42. Note that in the TOF scheme, the distance to the target article is detected based on the time of flight of light until the light is reflected by the target object and returns. A stereo camera or the like may also be used as the second camera 42. A stereo camera is configured to capture an image of a target object from two viewpoints, and a distance image is generated by deriving the distance to the target article based on the parallax between the two viewpoints. Note that the installation mode of the second camera 42 shown in FIG. 2 is an example, and the installation mode (installation position, number, etc.) of the second camera 42 can be modified as appropriate.

The dimension measurement unit 24 acquires a three-dimensional dimension of the target article 81 as stated below, for example. The dimension measurement unit 24 extracts the outline of the target article 81 from the captured image (distance image) of the target article 81 captured by the second camera 42, and acquires the dimension in a plan view of the target article 81 (specifically, the dimensions of two sides of a quadrilateral shape forming the outer edges of the upper surface S of the target article 81). Also, the dimension measurement unit 24 derives the difference between the height of the upper surface S of the target article 81 and the height of the lower surface of the target article 81 based on the captured image (distance image) of the target article 81 captured by the second camera 42 and acquires the height of the target article 81. Note that since the lower surface of the target article 81 is arranged at the same height as the upper surface of the support body 10 or the upper surface S of the article 80 one level below the target article 81, the height of the lower surface of the target article 81 can be acquired based on the height of one of these two upper surfaces.

The operation unit 25 moves the target article 81. As shown in FIG. 1, the operation unit 25 includes a holding unit 50 that holds the article 80 and a moving mechanism 51 that moves the holding unit 50. In the present embodiment, the holding unit 50 holds the upper surface S of the article 80. Specifically, the holding unit 50 holds the upper surface S of the article 80 by suction. The operation unit 25 moves the target article 81 by moving the holding unit 50 holding the target article 81 using the moving mechanism 51. In the present embodiment, the moving mechanism 51 is configured to be able to move the holding unit 50 to a position above the support body 10 (in the example shown in FIG. 1, the first support body 11) conveyed to the retrieval location P by the first conveying apparatus 91 and a position above the second conveying apparatus 92. Accordingly, the operation unit 25 is configured to be able to move the target article 81 retrieved from the support body 10 to the second conveying apparatus 92. In the example shown in FIG. 1, the moving mechanism 51 is configured to move the holding unit 50 coupled to the leading end of a multi-jointed arm by rotating a rotation platform and flexing and extending the multi-jointer arm supported by the rotation platform, although details are omitted here.

As shown in FIG. 1, in the present embodiment, the target article 81 is included in an article group 8 (here, a group of multiple articles 80 of the same type) placed on the support body 10, and is an article 80 on top of which another article 80 has not been placed. Also, in the present embodiment, the article distinguishing system 1 is configured to measure the dimension of the target article 81 using the dimension measurement unit 24 in a state in which the target article 81 has been moved by the operation unit 25 such that a gap is formed between the target article 81 and another article 80 (adjacent article 82) adjacent to the target article 81. Note that the target article 81 is moved by the operation unit 25 within a range in which a state of being placed on the support member 10 is maintained even if the holding performed by the holding unit 50 is removed. FIG. 1 shows a state after the target article 81 placed on the support body 10 (specifically, the first support body 11) has been moved such that gaps are formed between the target article 81 and two adjacent articles 82. By measuring the dimension of the target article 81 using the dimension measurement unit 24 in this state, it is possible to increase the accuracy of extracting the outline of the target article 81 and to achieve an improvement in the accuracy of measuring the dimension in a plan view of the target article 81, and it is possible to increase the accuracy of detecting the height of the surface arranged at the same height as the lower surface of the target article 81 and to achieve an improvement in the accuracy of measuring the height of the target article 81. Note that the processing for moving the target article 81 using the operation unit 25 such that gaps are formed between the target article 81 and the adjacent articles 82 may also be performed only if predetermined conditions have been satisfied, such as a case in which the dimension of the target article 81 cannot be measured appropriately.

The determination unit 31 is a functional unit that derives the degree of matching between the captured image of the target article 81 captured by the image capture unit 23 and the exterior image data stored in the storage unit 21 in association with the identification information acquired by the identification information acquisition unit 22 and determines whether the current state is a normal state in which exterior image data for which the degree of matching is a determination threshold value or more is present. That is, the determination unit 31 determines whether or not the current state is the normal state by performing matching degree derivation processing for deriving the degree of matching. The determination unit 31 determines that the current state is the normal state if exterior image data for which the degree of matching is a determination threshold value or more is present in the storage unit 21, and determines that the current state is not the normal state if the exterior image data for which the degree of matching is the determination threshold value or more is not present in the storage unit 21. The determination unit 31 derives the degree of matching by performing matching processing between the captured image of the target article 81 and the exterior image data. Specifically, the determination unit 31 derives a matching score (indicator of degree of matching) obtained through the matching processing as the degree of matching.

As described above, the storage unit 21 stores a specified number of pieces of exterior image data in association with one piece of identification information in sequence starting from the exterior image data that was stored in the storage unit 21 most recently. In the present embodiment, the determination unit 31 executes the matching degree derivation processing in sequence starting from the exterior image data that was stored in the storage unit 21 most recently, and when exterior image data with a degree of matching that is a determination threshold value or more is detected, the determination unit 31 ends the matching degree derivation processing and determines that the current state is the normal state. Note that, as in the present embodiment, the following configuration may also be used in the case where a group of multiple articles 80 of the same type is placed on one support body 10. That is, the matching degree derivation processing is executed in sequence starting from the exterior image data stored in the storage unit 21 most recently for the target article 81 selected from the article group 8. Then, if the exterior image data for which the degree of matching is a determination threshold value or more has been detected based on exterior image data other than the exterior image data that was stored in the storage unit 21 most recently among the multiple pieces of exterior image data stored in the storage unit 21, the matching degree derivation processing is first executed on the target article 81 selected next from the article group 8 using the detected exterior image data, and if the degree of matching is less than the determination threshold value, the matching degree derivation processing is executed on the remaining exterior image data in sequence starting from the exterior image data that was stored in the storage unit 21 most recently.

The learning processing unit 32 is a functional unit that executes learning processing if it has been determined by the determination unit 31 that the current state is not the normal state. The learning processing is processing for storing data of the captured image of the target article 81 captured by the image capture unit 23 as new exterior image data in the storage unit 21 in association with the identification information acquired by the identification information acquisition unit 22. Note that the storage unit 21 stores a specified number of pieces of the exterior image data in association with one piece of identification information in sequence starting from exterior image data that was stored in the storage unit 21 most recently. For this reason, when data of a captured image of the target article 81 captured by the image capture unit 23 is to be stored as new exterior image data in the storage unit 21 in association with identification information acquired by the identification information acquisition unit 22, if a specified number of pieces of exterior image data have already been stored in the storage unit 21 in association with the identification information, the learning processing unit 32 deletes the exterior image data that was stored in the storage unit 21 at the earliest time among the specified number of pieces of exterior image data, and stores the above-described new exterior image data in the storage unit 21.

In the present embodiment, if it has been determined by the determination unit 31 that the current state is not the normal state, the learning processing unit 32 executes learning processing under the condition that the dimension of the target article 81 measured by the dimension measurement unit 24 falls within an allowable dimension range obtained using, as a reference, the dimension data stored in the storage unit 21 in association with the identification information acquired by the identification information acquisition unit 22, and if the dimension of the target article 81 measured by the dimension measurement unit 24 does not fall within the allowable dimension range, it is determined that the current state is an abnormal state and the learning processing is not executed. The allowable dimension range is, for example, a range of 95% to 105% of the dimension data stored in the storage unit 21 (in other words, a range of ±5% with reference to the dimension data). In the present embodiment, the learning processing unit 32 executes the learning processing under the condition that the dimension of the target article 81 measured by the dimension measurement unit 24 falls within the allowable dimension range in each three-dimensional direction. Specifically, the learning processing unit 32 executes the learning processing under the condition that the dimension of the target article 81 measured by the dimension measurement unit 24 falls within the allowable dimension range in each extension direction of the three sides extending from one vertex of a cuboid forming the outer shape of the article 80. If the learning processing unit 32 has determined that the current state is an abnormal state, the article distinguishing system 1 performs, for example, notification (audio, blinking of a warning light, etc.) for notifying an operator such as a manager that the current state is an abnormal state.

A retrieval processing unit 33 is a functional unit that executes retrieval processing for retrieving the target article 81 from the support body 10. The retrieval processing unit 33 executes the retrieval processing by controlling the operation unit 25. In the example shown in FIG. 1, in the retrieval processing, the operation unit 25 is controlled so as to move the target article 81 retrieved from the support body 10 to the second conveying apparatus 92. In the present embodiment, if it has been determined by the determination unit 31 that the current state is the normal state, or if it has been determined by the determination unit 31 that the current state is not the normal state and the learning processing has been executed by the learning processing unit 32, the retrieval processing unit 33 retrieves the target article 81 from the support body 10. That is, if it has been determined by the learning processing unit 32 that the current state is an abnormal state, the retrieval processing unit 33 does not execute the retrieval processing.

As shown in FIG. 1, in the present embodiment, the target article 81 is included in an article group 8 (here, a group of multiple articles 80 of the same type) placed on the support body 10, and is an article 80 on top of which another article 80 has not been placed. In the retrieval processing, the retrieval processing unit 33 sequentially selects the target article 81 from the article group 8 and retrieves the selected target article 81 from the support body 10. At this time, each time a target article 81 to be subjected to the retrieval processing is selected by the retrieval processing unit 33, the determination unit 31 determines whether or not the current state is the normal state based on the captured image of the newly-selected target article 81.

Next, an example shown in FIG. 3 and an example shown in FIG. 4 will be described in the stated order regarding a procedure of article distinguishing processing executed by the article distinguishing system 1 of the present embodiment. In one aspect of the article distinguishing method of the article distinguishing system 1, a step of executing each processing (each step) shown in FIG. 3 is included, and in another aspect of the article distinguishing method of the article distinguishing system 1, a step of executing each processing (each step) shown in FIG. 4 is included.

First, the example shown in FIG. 3 will be described. FIG. 3 shows an example of a control flow performed in the case where processing for acquiring the identification information of the target article 81 performed by the identification information acquisition unit 22 is executed on each target article 81. Note that FIG. 3 shows a control flow for article distinguishing processing performed on one target article 81. That is, the series of processing shown in FIG. 3 is executed each time a target article 81 is selected. In a situation in which the type of the article 80 selected as the target article 81 can change for each selection of the target article 81, the processing for acquiring the identification information of the target article 81 performed by the identification information acquisition unit 22 is executed on each target article 81 as in the control flow shown in FIG. 3. For example, if the target articles 81 are sequentially selected from the support body 10 on which the multiple types of articles 80 are placed, or if the multiple types of articles 80 are each conveyed to a location at which article distinguishing processing is performed (in the example shown in FIG. 1, the retrieval location P) and are selected as the target article 81 in sequence starting from the article 80 conveyed to the location first, the type of the article 80 selected as the target article 81 can change for each selection of the target article 81.

Figure 3:
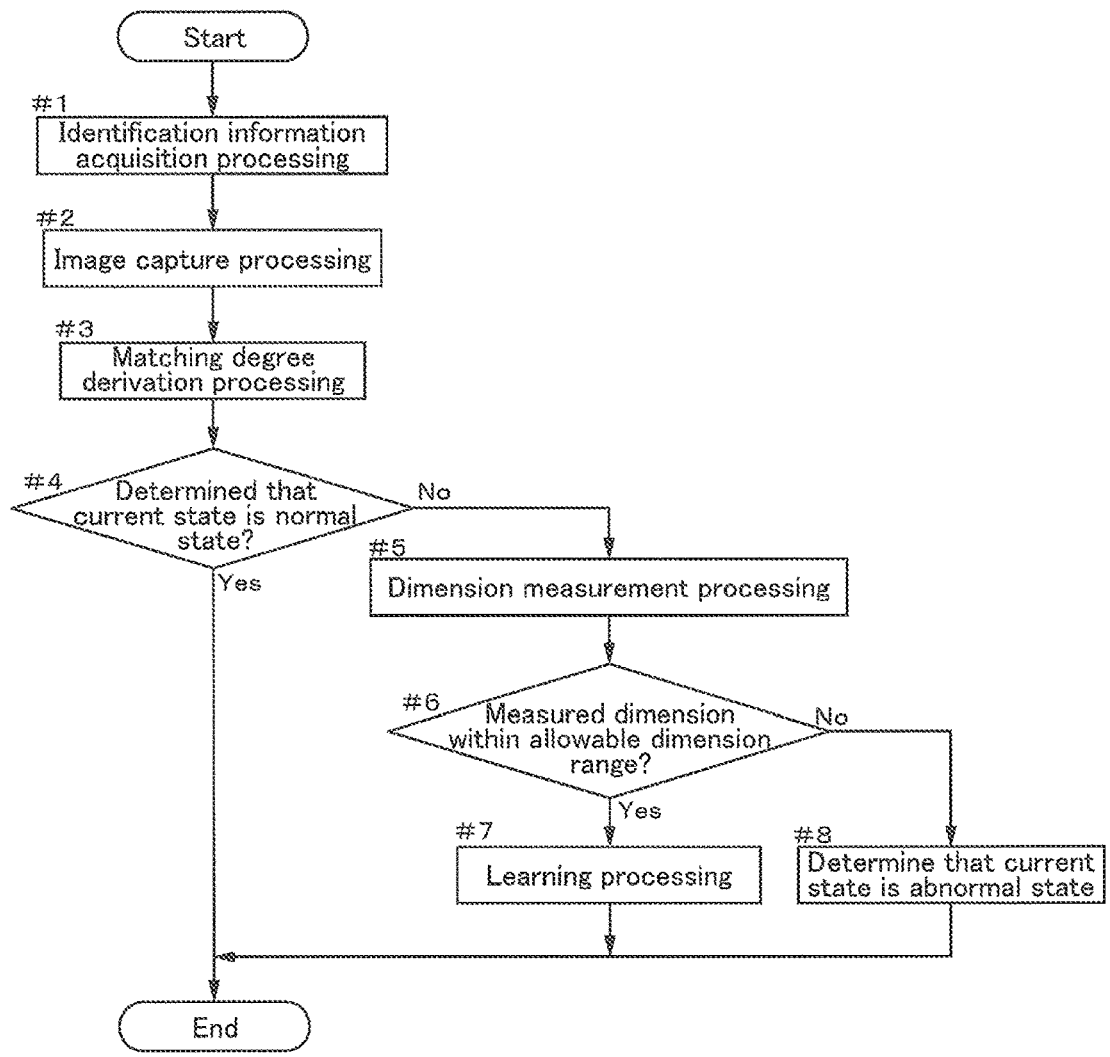
FIG. 3 is a flowchart showing an example of a control flow.
Figure 4:
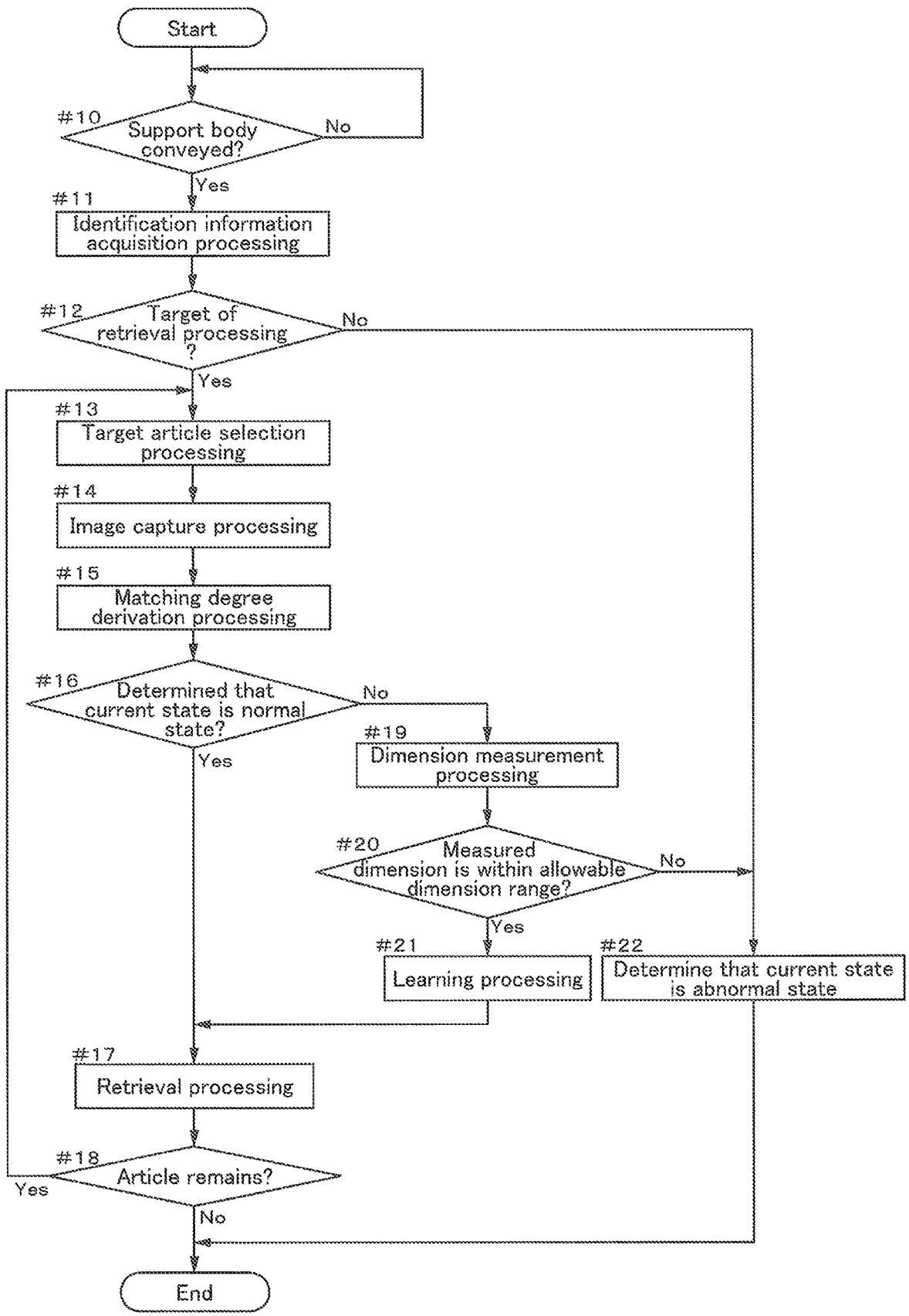
FIG. 4 is a flowchart showing another example of a control flow.

As shown in FIG. 3, the control apparatus 20 controls the identification information acquisition unit 22 to execute the identification information acquisition processing for acquiring the identification information of the target article 81 using the identification information acquisition unit 22 (step #1). Also, the control apparatus 20 controls the image capture unit 23 to execute image capture processing for capturing an image of the exterior of the target article 81 using the image capture unit 23 (step #2). Note that the image capture processing (step #2) may also be executed at the same time as the identification information acquisition processing (step #1) or before the execution of the identification information acquisition processing (step #1), instead of after the execution of the identification information acquisition processing (step #1). Then, based on a captured image of the target article 81 captured in the image capture processing (step #2) and the exterior image data stored in the storage unit 21 in association with the identification information acquired in the identification information acquisition processing (step #1), the determination unit 31 executes matching degree derivation processing (step #3). Note that if the currently-selected target article 81 is included in the captured image obtained in the image capture processing performed on the previously-selected target article 81, that is, if there is already a captured image of the currently-selected target article 81, the matching degree derivation processing (step #3) may also be performed using the captured image without performing the image capture processing (step #2).

The determination unit 31 determines whether or not the current state is the normal state based on the degree of matching derived in the matching degree derivation processing (step #3). Specifically, if there is exterior image data for which the degree of matching is a determination threshold value or more in the storage unit 21, the determination unit 31 determines that the current state is the normal state (step #4: Yes) and ends the processing. As described above, in the present embodiment, the matching degree derivation processing is executed in sequence starting from the exterior image data that was stored in the storage unit 21 mostly recently, and when exterior image data for which the degree of matching is the determination threshold value or more is detected, the matching degree derivation processing is ended and it is determined that the current state is the normal state. Note that if it is determined that the current state is the normal state and the processing is ended, or if later-described learning processing (step #7) is executed and the processing is ended, for example, processing for conveying the target article 81 from the location at which article distinguishing processing is performed (in the example shown in FIG. 1, retrieval location P) is performed.

On the other hand, if there is no exterior image data for which the degree of matching is the determination threshold value or more in the storage unit 21, the determination unit 31 determines that the current state is not the normal state (step #4: No), and the control apparatus 20 controls the dimension measurement unit 24 to execute the dimension measurement processing for measuring the dimension of the target article 81 using the dimension measurement unit 24 (step #5). Then, if the dimension of the target article 81 measured in the dimension measurement processing (step #5) falls within the allowable dimension range obtained using, as a reference, the dimension data stored in the storage unit 21 in association with the identification information acquired in the identification information acquisition processing (step #1) (step #6: Yes), the learning processing unit 32 executes learning processing for storing the data of the captured image of the target article 81 as new exterior image data in association with the identification information acquired in the identification information acquisition processing (step #1) in the storage unit 21 (step #7). Note that the captured image of the target article 81 obtained in the image capture processing (step #2) is used as the captured image of the target article 81 that is to be used as the new exterior image data, or the captured image of the target article 81, which is captured by the image capture unit 23 after it has been determined that the dimension of the target article 81 measured in the dimension measurement processing (step #5) falls within the allowable dimension range, is used as the captured image of the target article 81 that is to be used as the new exterior image data. On the other hand, if the dimension of the target article 81 measured in the dimension measurement processing (step #5) does not fall within the allowable dimension range (step #6: No), the learning processing unit 32 determines that the current state is an abnormal state (step #8) and the processing ends.

Next, the example shown in FIG. 4 will be described. FIG. 4 shows an example of a control flow performed in the case where processing for acquiring the identification information of the target article 81 performed by the identification information acquisition unit 22 is executed for each article group 8 (in other words, for each support body 10). For example, if the target article 81 is sequentially selected from a group of multiple articles 80 of the same type that are placed on the support body 10, the article distinguishing processing is executed according to the control flow shown in FIG. 4.

As shown in FIG. 4, when the support body 10 (in the example shown in FIG. 1, the first support body 11) is conveyed to the retrieval location P (step #10: Yes), the control apparatus 20 controls the identification information acquisition unit 22 to execute identification information acquisition processing for acquiring the identification information of an article 80 (article 80 to be selected as the target article 81) placed on the support body 10 using the identification information acquisition unit 22 (step #11). Then, if the article 80 corresponding to the identification information acquired in the identification information acquisition processing (step #11) is not the article 80 that is to be subjected to retrieval processing (step #12: No), the control apparatus 20 determines that the current state is an abnormal state (step #22), and the processing ends. For example, if a support body 10 on which articles 80 that are not to be subjected to the retrieval processing are placed is erroneously conveyed to the retrieval location P, it is determined that the current state is an abnormal state in this manner.

On the other hand, if the article 80 corresponding to the identification information acquired in the identification information acquisition processing (step #11) is the article 80 that is to be subjected to the retrieval processing (step #12: Yes), the retrieval processing unit 33 executes target article selection processing for selecting the target article 81 from the article group 8 placed on the support body 10 (step #13). The target article 81 is selected from among articles 80 on top of which other articles 80 have not been placed. Next, the control apparatus 20 controls the image capture unit 23 to execute image capture processing for capturing an image of the exterior of the target article 81 selected in the target article selection processing (step #13) using the image capture unit 23 (step #14). Then, the determination unit 31 executes the matching degree derivation processing based on the captured image of the target article 81 captured in the image capture processing (step #14) and the exterior image data stored in the storage unit 21 in association with the identification information acquired in the identification information acquisition processing (step #11) (step #15). Note that if the currently-selected target article 81 is included in the captured image obtained in the image capture processing performed on the previously-selected target article 81, that is, if there is already a captured image of the currently-selected target article 81, the matching degree derivation processing (step #15) may also be performed using the captured image without performing the image capture processing (step #14).

The determination unit 31 determines whether or not the current state is the normal state based on the degree of matching derived in the matching degree derivation processing (step #15). Specifically, if there is exterior image data for which the matching degree is a determination threshold value or more in the storage unit 21, the determination unit 31 determines that the current state is the normal state (step #16: Yes), and the retrieval processing unit 33 executes retrieval processing for retrieving the target article 81 from the support body 10 (step #17). In the example shown in FIG. 1, in the retrieval processing (step #17), the target article 81 retrieved from the support body 10 is moved to the second conveying apparatus 92 and thereafter is conveyed by the second conveying apparatus 92 from the retrieval location P. Then, if article 80 remains on the support body 10 (step #18: Yes), the processing is returned to step #13. For this reason, each time the target article 81 (here, the target article 81 that is to be subjected to retrieval processing) is selected in the target article selection processing (step #13), it is determined whether or not the current state is the normal state based on the captured image of the newly-selected target article 81 in the matching degree derivation processing (step #15). On the other hand, if no article 80 remains on the support body 10 (step #18: No), the processing ends.

In this manner, in the control flow shown in FIG. 4, the matching degree derivation processing (step #15) is executed each time the target article 81 is selected in the target article selection processing (step #13). The control flow shown in FIG. 4 is used in the case where, for example, the target article 81 is sequentially selected from a group of multiple articles 80 of the same type placed on the support body 10. In this case, in the matching degree derivation processing (step #15), if the exterior image data for which the degree of matching is a determination threshold value or more has been detected based on data other than the exterior image data that was stored in the storage unit 21 most recently among the multiple pieces of exterior image data stored in the storage unit 21, there is a high likelihood that the degree of matching of the detected exterior image data will be high also in the matching degree derivation processing (step #15) executed on the next target article 81.

In consideration of this point, for example, the following configuration can be used. That is, in general, the matching degree derivation processing is executed on the target article 81 selected from the article group 8 in sequence starting from the exterior image data that was stored in the storage unit 21 most recently. Then, if the exterior image data for which the degree of matching is a determination threshold value or more has been detected based on a piece of data other than the exterior image data that was stored in the storage unit 21 most recently among the multiple pieces of exterior image data stored in the storage unit 21, the matching degree derivation processing is first executed on the target article 81 selected next from the article group 8 using the detected exterior image data, and if the degree of matching is less than the determination threshold value, the matching degree derivation processing is executed on the remaining exterior image data in sequence starting from the exterior image data that was stored in the storage unit 21 most recently.

If there is no exterior image data for which the degree of matching is the determination threshold value or more in the storage unit 21, the determination unit 31 determines that the current state is not the normal state (step #16: No), and the control apparatus 20 controls the dimension measurement unit 24 to execute the dimension measurement processing for measuring the dimension of the target article 81 using the dimension measurement unit 24 (step #19). Then, if the dimension of the target article 81 measured in the dimension measurement processing (step #19) does not fall in the allowable dimension range obtained using, as a reference, the dimension data stored in the storage unit 21 in association with the identification information acquired in the identification information acquisition processing (step #11) (step #20: No), the learning processing unit 32 determines that the current state is an abnormal state (step #22) and the processing ends.

On the other hand, if the dimension of the target article 81 measured in the dimension measurement processing (step #19) falls within the allowable dimension range (step #20: Yes), the learning processing unit 32 executes learning processing (step #21) for storing the data of the captured image of the target article 81 as new exterior image data in the storage unit 21 in association with the identification information acquired in the identification information acquisition processing (step #11), and the retrieval processing unit 33 executes the retrieval processing for retrieving the target article 81 from the support body 10 (step #17). In this manner, the retrieval processing unit 33 executes the retrieval processing if it has been determined that the current state is the normal state or if it has been determined that the current state is not the normal state and the learning processing has been executed. Note that the captured image of the target article 81 obtained in the image capture processing (step #14) is used as the captured image of the target article 81 that is to be used as the new exterior image data in the learning processing (step #21), or the captured image of the target article 81, which is captured by the image capture unit 23 after it has been determined that the dimension of the target article 81 measured in the dimension measurement processing (step #19) falls within the allowable dimension range, is used as the captured image of the target article 81 that is to be used as the new exterior image data in the learning processing (step #21).

Note that when executing the retrieval processing (step #17), the target article 81 retrieved from the support body 10 can be moved to the movement destination (in the example shown in FIG. 1, the second conveying apparatus 92) in the same orientation by distinguishing the orientation of the target article 81 through image analysis using the exterior image of the target article 81 and the exterior image data. Accordingly, even if the upper surfaces S of the articles 80 are formed into square shapes unlike in the example shown in FIG. 1, for example, the target articles 81 (processed articles 83) retrieved from the support body 10 can be conveyed from the retrieval location P with the opening and closing directions of lids provided on the upper surfaces S aligned.

Other Embodiments

Next, other embodiments of the article distinguishing system will be described.

(1) The above-described embodiment described, as an example, a configuration in which the learning processing unit 32 executes learning processing under the condition that the dimension of the target article 81 measured by the dimension measurement unit 24 falls within the allowable dimension range if it has been determined by the determination unit 31 that the current state is not the normal state.

However, the present disclosure is not limited to such a configuration, and may also include other conditions as conditions for the learning processing unit 32 to execute the learning processing in addition to the condition that the dimension of the target article 81 measured by the dimension measurement unit 24 falls within the allowable dimension range. It is also possible to not include the condition that the dimension of the target article 81 measured by the dimension measurement unit 24 falls within the allowable dimension range in the conditions for the learning processing unit 32 to execute the learning processing. In this case, for example, it is possible to use a configuration in which the article distinguishing system 1 does not include the dimension measurement unit 24, and the learning processing unit 32 executes the learning processing without giving consideration to other conditions (i.e., unconditionally) if it has been determined by the determination unit 31 that the current state is not the normal state. If the article distinguishing system 1 does not include the dimension measurement unit 24 in this manner, the storage unit 21 may also have a configuration in which the dimension data of the article 80 is not stored in association with the identification information of the article 80.

(2) The above-described embodiment described, as an example, a configuration in which multiple articles 80 are arranged on one support body 10 side by side in two horizontal directions that are orthogonal to each other. However, the present disclosure is not limited to such a configuration, and it is also possible to use a configuration in which multiple articles 80 are arranged on one support body 10 side by side only in one horizontal direction, or a configuration in which only one article 80 is arranged at the same height on one support body 10. Also, the above-described embodiment described, as an example, a configuration in which multiple articles 80 are stacked on the support body 10. However, the present disclosure is not limited to such a configuration, and it is also possible to use a configuration in which the articles 80 are not stacked on the support body 10.

(3) The above-described embodiment described, as an example, a configuration in which multiple articles 80 of the same type are placed on one support body 10. However, the present disclosure is not limited to such a configuration, and it is also possible to use a configuration in which multiple articles 80 of mutually different types are placed on one support body 10. It is also possible to use a configuration in which only one article 80 is supported on one support body 10, or a configuration in which the article 80 is directly supported on a conveying surface of the first conveying apparatus 91.

(4) The above-described embodiment described, as an example, a configuration in which the outer shape of the article 80 is formed into a cuboid shape. However, the present disclosure is not limited to such a configuration, and the outer shape of the article 80 may also be a shape other than a cuboid shape. Also, the above-described embodiment described, as an example, a configuration in which the article 80 is a container that contains cargo. However, the present disclosure is not limited to such a configuration, and the article 80 may also be an article other than a container.

(5) The above-described embodiment described, as an example, a case in which the article distinguishing system 1 is applied to a retrieval location P (in the example shown in FIG. 1, a depalletizing task location) in the distribution facility 100. However, the present disclosure is not limited to such a configuration, and the article distinguishing system according to the present disclosure can also be applied to a location at which a task (article inspection task) of comparing the type and number of the article 80 and the content of a conveying order (e.g., content written on a delivery slip) is performed, a location at which a task of creating a database of the types and numbers of articles 80 is performed, and the like.

(6) Note that as long as there are no discrepancies, the configuration disclosed in the above-described embodiment can also be applied in combination with configurations disclosed in the other embodiments (includes combinations of embodiments described as the other embodiments). Regarding the other configurations as well, the embodiments disclosed in the present specification are merely simple illustrations in all respects. Accordingly, various modifications can be performed without straying from the gist of the present disclosure.

Overview of Above-Described Embodiments

Hereinafter, an overview of the article distinguishing system described above will be described.

An article distinguishing system includes: a storage unit configured to store exterior image data, which is data of an exterior image of an article, in association with identification information of the article; an identification information acquisition unit configured to acquire identification information of a target article, which is an article to be subjected to distinguishing; an image capture unit configured to capture an image of an exterior of the target article; a determination unit configured to derive a degree of matching between a captured image of the target article captured by the image capture unit and the exterior image data stored in the storage unit in association with the identification information acquired by the identification information acquisition unit, and determine whether or not the current state is a normal state in which the exterior image data for which the degree of matching is a determination threshold value or more is present; and a learning processing unit configured to execute learning processing if it has been determined by the determination unit that the current state is not the normal state. The learning processing is processing for storing data of the captured image as new said exterior image data in the storage unit in association with the identification information acquired by the identification information acquisition unit, and the storage unit stores a specified number, which is two or more, of pieces of the exterior image data in association with one piece of identification information in sequence starting from the piece of exterior image data that was stored in the storage unit most recently.

According to the present configuration, if it is determined by the determination unit that the current state is not the normal state, that is, if exterior image data for which the degree of matching with a captured image of a target article is a determination threshold value or more is not present in the storage unit, the captured image of the target article can be stored in the storage unit as new exterior image data in association with the identification information of the target article. Accordingly, if the exterior design of the target article has been changed, the exterior image data corresponding to the changed exterior design can be generated and registered. This makes it possible to reduce labor performed by an operator compared to a case in which an operator manually performs a task of generating and registering exterior image data corresponding to a changed exterior design.

Incidentally, the exterior design of a target article is periodically changed between multiple exterior designs in some cases, and is returned to the original design after being temporarily changed in some cases. For example, if the target article is a container for containing a product, the exterior design of the target article is changed periodically between multiple exterior designs according to the season, or is returned to the original design after being temporarily changed due to a sales promotion activity such as a sale. In these cases, the changed exterior design of the target article is the same as the exterior design of the target article before change or prior thereto. With a focus on this point, in the present configuration, a specified number of pieces of exterior image data are stored in the storage unit in association with one piece of identification information in sequence starting from the exterior image data that was stored in the storage unit most recently. This makes it possible for exterior image data corresponding to a changed exterior design to be present in the storage unit if the exterior design of the target article is changed periodically between multiple exterior designs or is returned to its original design after being changed temporarily. If exterior image data corresponding to the changed exterior design is present in the storage unit, there is no need to generate and register exterior image data corresponding to the changed exterior design, and therefore the frequency of generating and registering exterior image data can be accordingly suppressed to a low level.

Note that in the present configuration, although the exterior image data stored in the storage unit prior to the above-described specified number of pieces of exterior image data is deleted from the storage unit, even if the changed exterior design of the target article is the same as a prior exterior design of the target article, it is often the case that the prior exterior design was used relatively recently. For this reason, according to the present configuration, by limiting the number of pieces of exterior image data stored in association with one piece of identification information to a specified number or less, it is possible to leave exterior image data corresponding to an exterior design that is highly likely to be used again in the storage unit while achieving a reduction of the storage capacity needed for the storage unit.

Here, it is preferable that the determination unit executes matching degree derivation processing for deriving the degree of matching in sequence starting from the exterior image data that was stored in the storage unit most recently, and if the exterior image data for which the degree of matching is the determination threshold value or more is detected, the determination unit ends the matching degree derivation processing and determines that the current state is the normal state.

According to the present configuration, it is possible to execute the matching degree derivation processing in sequence starting from exterior image data that is highly likely to have a high degree of matching. Accordingly, if the exterior image data for which the degree of matching is a determination threshold value or more is stored in the storage unit, it is possible to achieve a shortening of the amount of processing time until it is determined that the current state is the normal state.

Also, it is preferable that the article distinguishing system includes a dimension measurement unit configured to measure a dimension of the target article. The storage unit stores dimension data, which is data of a dimension of an article, in association with the identification information of the article, and if it has been determined by the determination unit that the current state is not the normal state, the learning processing unit executes the learning processing under the condition that the dimension of the target article measured by the dimension measurement unit falls within an allowable dimension range obtained using, as a reference, the dimension data stored in the storage unit in association with the identification information acquired by the identification information acquisition unit, and if the dimension of the target article measured by the dimension measurement unit does not fall within the allowable dimension range, the learning processing unit determines that the current state is an abnormal state and does not execute the learning processing.

According to the present configuration, if it has been determined by the determination unit that the current state is not the normal state, it is possible to determine whether or not the target article is the article corresponding to the identification information acquired by the identification information acquisition unit (hereinafter referred to as "identified article") according to whether or not the dimension of the target article measured by the dimension measurement unit falls within the above-described allowable dimension range. Also, it is possible to use a configuration in which the learning processing is not executed if there is a low likelihood that the target article is the identified article since the learning processing is executed under the condition that the dimension of the target article measured by the dimension measurement unit falls within the above-described allowable dimension range. Accordingly, if the target article is not the identified article, it is easier to avoid a case in which the data of the captured image of the target article is erroneously stored as new exterior image data in the storage unit in association with the identification information of the article that is different from the target article.

In the above-described configuration, it is preferable that the article distinguishing system further includes an operation unit configured to move the target article. The target article is an article that is included in a group of a plurality of articles of the same type placed on a support body, and on top of which another article has not been placed, and the dimension of the target article is measured by the dimension measurement unit in a state in which the target article has been moved by the operation unit such that a gap is formed between the target article and another adjacent article.

According to the present configuration, if the target article is included in a group of multiple articles of the same type placed on the support body, the dimension of the target article is more easily accurately measured by the dimension measurement unit. This makes it possible to achieve an improvement in the accuracy of determining whether or not the target article is the identified article.

Also, it is preferable that the dimension measurement unit includes a TOF (Time of Flight) camera or a stereo camera.

According to the present configuration, the three-dimensional dimension of the target article can be measured by the dimension measurement unit. Accordingly, in the determination of whether or not the dimension of the target article measured by the dimension measurement unit falls within the above-described allowable dimension range, it is possible to give consideration to the three-dimensional shape of the target article, and it is possible to achieve an improvement in the accuracy of determining whether or not the target article is the identified article.

In the article distinguishing system of the above-described configurations, it is preferable that the target article is an article that is included in an article group, which is a group of a plurality of articles placed on a support body, and on top of which another article has not been placed, the article distinguishing system further includes a retrieval processing unit configured to execute retrieval processing for sequentially selecting the target article from the article group and retrieving the selected target article from the support body, each time the target article that is to be subjected to the retrieval processing is selected by the retrieval processing unit, the determination unit determines whether or not the current state is the normal state based on a captured image of the newly-selected target article, and if it has been determined by the determination unit that the current state is the normal state, or if it has been determined by the determination unit that the current state is not the normal state and the learning processing has been executed by the learning processing unit, the retrieval processing unit retrieves the selected target article from the support body.

According to the present configuration, it is possible for the determination unit to determine whether or not the current state is the normal state for each target article when executing retrieval processing for sequentially selecting the target article from the article group placed on the support body and retrieving the target article from the support body, and the exterior image data corresponding to the changed exterior design can be generated and registered if the exterior design of the target article has been changed. That is, according to the present configuration, it is possible to use the retrieval processing as an opportunity to perform generation and registration of the exterior image data in the case where the exterior design of the target article has been changed. Note that according to the present configuration, for example, it is also possible to align the orientation of the target article retrieved from the support body by recognizing the orientation of the target article using the exterior image data during execution of the retrieval processing.

The article distinguishing system according to the present disclosure need only be able to exhibit at least one of the above-described effects.

What is claimed is:

1. An article distinguishing system comprising:
    a storage unit configured to store exterior image data, which is data of an exterior image of an article collected by image capture at a prior time, in association with identification information of the article;
    an identification information acquisition unit configured to acquire identification information of a target article, which is an article to be subjected to distinguishing;
    an image capture unit configured to capture an image of an exterior of the target article;
    a determination unit configured to derive a degree of matching between a captured image of the target article captured by the image capture unit and the exterior image data stored in the storage unit in association with the identification information acquired by the identification information acquisition unit, and determine whether or not the current state is a normal state in which the exterior image data for which the degree of matching is a determination threshold value or more is present; and
    a learning processing unit configured to execute learning processing if it has been determined by the determination unit that the current state is not the normal state,
    wherein the learning processing is processing for storing data of the captured image in which the exterior image data for which the degree of matching is the determination threshold value or more is not present as new said exterior image data in the storage unit in association with the identification information acquired by the identification information acquisition unit,
    wherein the storage unit stores a specified number, which is two or more, of pieces of the exterior image data in association with one piece of identification information in sequence starting from the exterior image data that was stored in the storage unit most recently, and
    wherein, when the determination unit executes a determination on a next target article, the determination unit derives the degree of matching based on the specified number, which is two or more, of pieces of the exterior image data including the exterior image data that was stored in the storage unit most recently, and if the exterior image data for which the degree of matching is the determination threshold value or more is present, the determination unit determines that the current state is the normal state.

2. The article distinguishing system according to claim 1, wherein the determination unit executes matching degree derivation processing for deriving the degree of matching in sequence starting from the exterior image data that was stored in the storage unit most recently, and if the exterior image data for which the degree of matching is the determination threshold value or more is detected, the determination unit ends the matching degree derivation processing and determines that the current state is the normal state.

3. The article distinguishing system according to claim 1, further comprising:
    a dimension measurement unit configured to measure a dimension of the target article, and
    wherein the storage unit stores dimension data, which is data of a dimension of an article, in association with identification information of the article, and
    wherein if it has been determined by the determination unit that the current state is not the normal state, the learning processing unit executes the learning processing under the condition that the dimension of the target article measured by the dimension measurement unit falls within an allowable dimension range obtained using, as a reference, the dimension data stored in the storage unit in association with the identification information acquired by the identification information acquisition unit, and if the dimension of the target article measured by the dimension measurement unit does not fall within the allowable dimension range, the learning processing unit determines that the current state is an abnormal state and does not execute the learning processing.

4. The article distinguishing system according to claim 3, further comprising:
    an operation unit configured to move the target article, and
    wherein the target article is an article that is included in a group of a plurality of articles of the same type placed on a support body, and on top of which another article has not been placed, and
    wherein the dimension of the target article is measured by the dimension measurement unit in a state in which the target article has been moved by the operation unit such that a gap is formed between the target article and another adjacent article.

5. The article distinguishing system according to claim 3, wherein the dimension measurement unit includes a TOF (Time of Flight) camera or a stereo camera.

6. An article distinguishing system, comprising:
    a storage unit configured to store exterior image data, which is data of an exterior image of an article, in association with identification information of the article;
    an identification information acquisition unit configured to acquire identification information of a target article, which is an article to be subjected to distinguishing;

an image capture unit configured to capture an image of an exterior of the target article;

a determination unit configured to derive a degree of matching between a captured image of the target article captured by the image capture unit and the exterior image data stored in the storage unit in association with the identification information acquired by the identification information acquisition unit, and determine whether or not the current state is a normal state in which the exterior image data for which the degree of matching is a determination threshold value or more is present; and a learning processing unit configured to execute learning processing if it has been determined by the determination unit that the current state is not the normal state, wherein the learning processing is processing for storing data of the captured image as new said exterior image data in the storage unit in association with the identification information acquired by the identification information acquisition unit, wherein the storage unit stores a specified number, which is two or more, of pieces of the exterior image data in association with one piece of identification information in sequence starting from the exterior image data that was stored in the storage unit most recently, the target article is an article that is included in an article group, which is a group of a plurality of articles placed on a support body, and on top of which another article has not been placed, the article distinguishing system further includes a retrieval processing unit configured to execute retrieval processing for sequentially selecting the target article from the article group and retrieving the selected target article from the support body, each time the target article that is to be subjected to the retrieval processing is selected by the retrieval processing unit, the determination unit determines whether or not the current state is the normal state based on a captured image of the newly-selected target article, and if it has been determined by the determination unit that the current state is the normal state, or if it has been determined by the determination unit that the current state is not the normal state and the learning processing has been executed by the learning processing unit, the retrieval processing unit retrieves the selected target article from the support body.

7. An article distinguishing system comprising:

a storage unit configured to store exterior image data, which is data of an exterior image of an article, in association with identification information of the article;

an identification information acquisition unit configured to acquire identification information of a target article, which is an article to be subjected to distinguishing;

an image capture unit configured to capture an image of an exterior of the target article;

a determination unit configured to derive a degree of matching between a captured image of the target article captured by the image capture unit and the exterior image data stored in the storage unit in association with the identification information acquired by the identification information acquisition unit, and determine whether or not the current state is a normal state in which the exterior image data for which the degree of matching is a determination threshold value or more is present;

a learning processing unit configured to execute learning processing if it has been determined by the determination unit that the current state is not the normal state;

a dimension measurement unit configured to measure a dimension of the target article; and an operation unit configured to move the target article, wherein the learning processing is processing for storing data of the captured image as new said exterior image data in the storage unit in association with the identification information acquired by the identification information acquisition unit, wherein the storage unit stores a specified number, which is two or more, of pieces of the exterior image data in association with one piece of identification information in sequence starting from the exterior image data that was stored in the storage unit most recently, wherein the storage unit stores dimension data, which is data of a dimension of an article, in association with identification information of the article, wherein if it has been determined by the determination unit that the current state is not the normal state, the learning processing unit executes the learning processing under the condition that the dimension of the target article measured by the dimension measurement unit falls within an allowable dimension range obtained using, as a reference, the dimension data stored in the storage unit in association with the identification information acquired by the identification information acquisition unit, and if the dimension of the target article measured by the dimension measurement unit does not fall within the allowable dimension range, the learning processing unit determines that the current state is an abnormal state and does not execute the learning processing, wherein the target article is an article that is included in a group of a plurality of articles of the same type placed on a support body, and on top of which another article has not been placed, and wherein the dimension of the target article is measured by the dimension measurement unit in a state in which the target article has been moved by the operation unit such that a gap is formed between the target article and another adjacent article.

8. The article distinguishing system according to claim 2, wherein, if the exterior image data for which the degree of matching is the determination threshold value or more has been detected from the exterior image data in the storage unit other than the exterior image data that was stored in the storage unit most recently, the determination unit executes the matching degree derivation processing on a next target article using first the exterior image data for which the degree of matching was the determination threshold value or more in a previous matching degree derivation processing.

* * * * *